United States Patent
Sivaji et al.

(10) Patent No.: US 12,001,792 B2
(45) Date of Patent: *Jun. 4, 2024

(54) GENERATING PRESENTATION SLIDES WITH DISTILLED CONTENT

(71) Applicant: Google LLC, Mountain View, CA (US)

(72) Inventors: Vishnu Sivaji, New York, NY (US); Steven Joseph Saviano, Brooklyn, NY (US); Andrea Dulko, Brooklyn, NY (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/972,411

(22) Filed: Oct. 24, 2022

(65) Prior Publication Data

US 2023/0153523 A1 May 18, 2023

Related U.S. Application Data

(63) Continuation of application No. 15/807,431, filed on Nov. 8, 2017, now Pat. No. 11,481,550.
(Continued)

(51) Int. Cl.
  *G06F 40/258* (2020.01)
  *G06F 16/34* (2019.01)
  (Continued)

(52) U.S. Cl.
  CPC .......... *G06F 40/258* (2020.01); *G06F 16/345* (2019.01); *G06F 40/103* (2020.01);
  (Continued)

(58) Field of Classification Search
  CPC .... G06F 40/258; G06F 40/103; G06F 40/131; G06F 40/186; G06F 40/106; G06F 16/345
  See application file for complete search history.

(56) References Cited

U.S. PATENT DOCUMENTS

| | | |
|---|---|---|
| 6,970,859 B1 | 11/2005 | Brechner |
| 7,171,619 B1 | 1/2007 | Bianco |

(Continued)

FOREIGN PATENT DOCUMENTS

| | | |
|---|---|---|
| CN | 103718215 A | 4/2014 |
| CN | 105930471 A | 9/2016 |

(Continued)

OTHER PUBLICATIONS

Anonymous: ""Predicting Chart Types with Machine Learning—Feature Releases—Chartio Community"", Web Archive of webpage, Jun. 6, 2016 (Jun. 6, 2016), pp. 1-3, XP554281 02,Retrieved from the Internet: URL:http//web.archive.org/web/20160606043352/http://community.chartio.com :80/t/predicting-chart-types-with-machine-learning/93 [retrieved on Nov. 23, 2017] 3 pages.

(Continued)

*Primary Examiner* — Scott T Baderman
*Assistant Examiner* — Seung Woon Jung
(74) *Attorney, Agent, or Firm* — Lowenstein Sandler LLP

(57) ABSTRACT

A method for generating presentation slides with distilled content including receiving one or more data files as source material for slide generation, obtaining content from the one or more data files for a slide of a slide presentation, identifying a layout template for the slide based on the content, and distilling the content into distilled content to generate a presentation visualization item based on the distilled content. The distilled content may include a subset of the content. The method may also include generating the slide based on the presentation visualization item and the layout template.

20 Claims, 13 Drawing Sheets

Related U.S. Application Data

(60) Provisional application No. 62/420,263, filed on Nov. 10, 2016.

(51) Int. Cl.
  *G06F 40/103* (2020.01)
  *G06F 40/106* (2020.01)
  *G06F 40/131* (2020.01)
  *G06F 40/186* (2020.01)
  *G06N 20/00* (2019.01)
  *G06F 40/151* (2020.01)
  *G06F 40/177* (2020.01)

(52) U.S. Cl.
  CPC .......... *G06F 40/106* (2020.01); *G06F 40/131* (2020.01); *G06F 40/186* (2020.01); *G06N 20/00* (2019.01); *G06F 40/151* (2020.01); *G06F 40/177* (2020.01)

(56) References Cited

U.S. PATENT DOCUMENTS

| | | | |
|---|---|---|---|
| 7,631,254 | B2 | 12/2009 | Layard |
| 7,743,331 | B1 * | 6/2010 | Fleischer ................. G09B 7/04 |
| | | | 434/323 |
| 8,504,827 | B1 | 8/2013 | Sizer |
| 8,904,269 | B2 | 12/2014 | Antley |
| 10,460,023 | B1 * | 10/2019 | Shriver ................. G06F 40/117 |
| 2002/0194227 | A1 | 12/2002 | Day |
| 2004/0172584 | A1 | 9/2004 | Jones |
| 2004/0216149 | A1 | 10/2004 | Reitz |
| 2005/0108619 | A1 | 5/2005 | Theall |
| 2006/0036964 | A1 | 2/2006 | Satterfield |
| 2006/0059442 | A1 | 3/2006 | Bornstein |
| 2008/0243892 | A1 | 10/2008 | Little |
| 2009/0150800 | A1 | 6/2009 | Wood |
| 2011/0185297 | A1 | 7/2011 | Reid |
| 2011/0264705 | A1 | 10/2011 | Diamond |
| 2012/0192064 | A1 | 7/2012 | Antebi |
| 2012/0278704 | A1 | 11/2012 | Ying |
| 2013/0097177 | A1 * | 4/2013 | Fan ......................... G06F 40/18 |
| | | | 707/805 |
| 2013/0205202 | A1 * | 8/2013 | Xiao ..................... G06F 40/117 |
| | | | 715/249 |
| 2014/0075296 | A1 | 3/2014 | Schaad |
| 2014/0089816 | A1 | 3/2014 | DiPersia |
| 2014/0157169 | A1 | 6/2014 | Kikin-Gil |
| 2014/0380171 | A1 | 12/2014 | Maloney |
| 2015/0019957 | A1 | 1/2015 | Ying |
| 2017/0031654 | A1 | 2/2017 | Zhang |
| 2017/0147568 | A1 | 5/2017 | Chen |
| 2017/0262416 | A1 | 9/2017 | Rezgui |
| 2018/0130496 | A1 * | 5/2018 | Mahapatra .............. G11B 27/28 |
| 2018/0196784 | A1 * | 7/2018 | Kumar .................. G06F 3/0482 |
| 2018/0349449 | A1 | 12/2018 | Lindley |

FOREIGN PATENT DOCUMENTS

| | | |
|---|---|---|
| EP | 0933712 A2 | 8/1999 |
| WO | 201318445 A1 | 12/2013 |
| WO | 2013184451 A1 | 12/2013 |

OTHER PUBLICATIONS

Bhandare Anuja A et al: ""Automatic era: Presentation slides from Academic paper"", 2016 International Conference on Automatic Control and Dynamic Optimization Techniques (ICACDOT), IEEE, Sep. 9, 2016 (Sep. 9, 2016), pp. 809-814.

Bob Flisser, "How to Use and Edit PowerPoint Master Slides", Date: Mar. 2014, publisher: Tuts+, pp. 1-18 (Year: 2014).

Al Masum S M et al: ""Auto-Presentation: A Multi-Agent System for Building Automatic Multi-Modal Presentation of a Topic from World Wide Web Information"", Intelligent Agent Technology, IEEE/WIC/ACM International Conference on Compiegne Codex, France Sep. 19-22, 2005, Piscataway, NJ, USA, IEEE, Sep. 19, 2005 (Sep. 19, 2005). pp. 246-249.

B Muthazhagan et al: ""A Text Mining Approach to Generate Powerpoint Presentation Using Machine Learning Algorithm"", Middle-East Journal of Scientific Research, vol. 24, No. 5, Aug. 1, 2016 (Aug. 1, 2016), pp. 1692-1699.

Pinard et al. ("CMPTR", Date: 2016, publisher: Cengage Learning, p. 603 (Year 2016).

M Sravanthi et al: ""SlidesGen: Automatic Generation of Presentation Slides for a Technical Paper Using Summarization"", Proceedings of the Twenty-Second International Flairs Conference (2009), May 19, 2009 (May 19, 2009), pp. 284-289.

PCT Search Report Written Opinion, Re: Application # PCT/US2017/060933, dated Nov. 9, 2017. 18 pages.

European Combined Search and Examination Report for G. B. Application No. 1718646.1 dated Jan. 23, 2020 4 pages.

European Combined Search and Examination Report for G. B. Application No. 1718646.1 dated Apr. 24, 2018 4 pages.

Office Action for D.E. Application No. 201820107014.2 dated Mar. 7, 2019 2 pages.

Office Action for G. B. Application No. 1718646.1 dated Aug. 24, 2020 2 pages.

Office Action for G. B. Application No. 1718646.1 dated Jan. 23, 2020 4 pages.

Office Action for Chinese Application No. 201711108164.6 dated May 20, 2021, 19 pages.

Anonymous, Middle-East Journal of Scientific Research, Aug. 27, 2016, vol. 24 (5), Internet Archive WaybackMachine, XP055450632, [Retrieved on Feb. 13, 2018] Retrieved from URL: http://web.archive.org/web/20160827004047/ http://www.idosi.org/mejsr/mejsr24(5)16.htm.

"Converting Word Documents to PowerPoint Presentations," K2 Enterprises, Transcription and Pictures from a YouTube Video, Jul. 28, 2013, 06 pages, Retrieved from URL: https://www.youtube.com/watch?v=iynRpt3w1Lc.

\* cited by examiner

GENERATING PRESENTATION SLIDES WITH DISTILLED CONTENT

RELATED APPLICATIONS

This application is a continuation application of co-pending U.S. patent application Ser. No. 15/807,431, filed Nov. 8, 2017, which claims the benefit under 35 U.S.C. § 119(e) of U.S. Provisional Application No. 62/420,263, filed Nov. 10, 2016, each of which is incorporated herein by reference.

TECHNICAL FIELD

Aspects and implementations of the present disclosure relate to electronic documents, and more specifically, to generating presentation slides with distilled content.

BACKGROUND

A presentation slide deck may include a set of presentation slides that may be displayed to one or more people to provide visual illustration during a presentation. A presentation slide may refer to a display page that includes text, images, video, and/or audio for presenting to the one or more people. For example, a presentation slide may include short sentences or bullet points to describe information that is to be conveyed by the presenter. To prepare a set of presentation slides, a presenter may conduct research and collect one or more documents relating to a presentation topic. The presenter may summarize a large amount of textual content from the documents into short descriptions or illustrations in the presentation slides. Further, a presenter may also design and arrange the layout and format of each slide, such as font size, color, background color, bullet point aligning, and/or animation configuration.

SUMMARY

Aspects and implementations of the present disclosure are directed to generating slides with distilled content for a slide presentation. One or more data files may be obtained as supporting material for slide generation. Content in the one or more data files may be automatically extracted or a user may select the desired content to extract for slide generation. A layout template may be identified and selected based on the type of extracted content. The extracted content may be distilled into distilled content to generate presentation visualization items, such as lists (e.g., bullet points), data charts, data tables, images, etc., based on the distilled content. A presentation slide may then be generated based on the presentation visualization item and the layout template.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
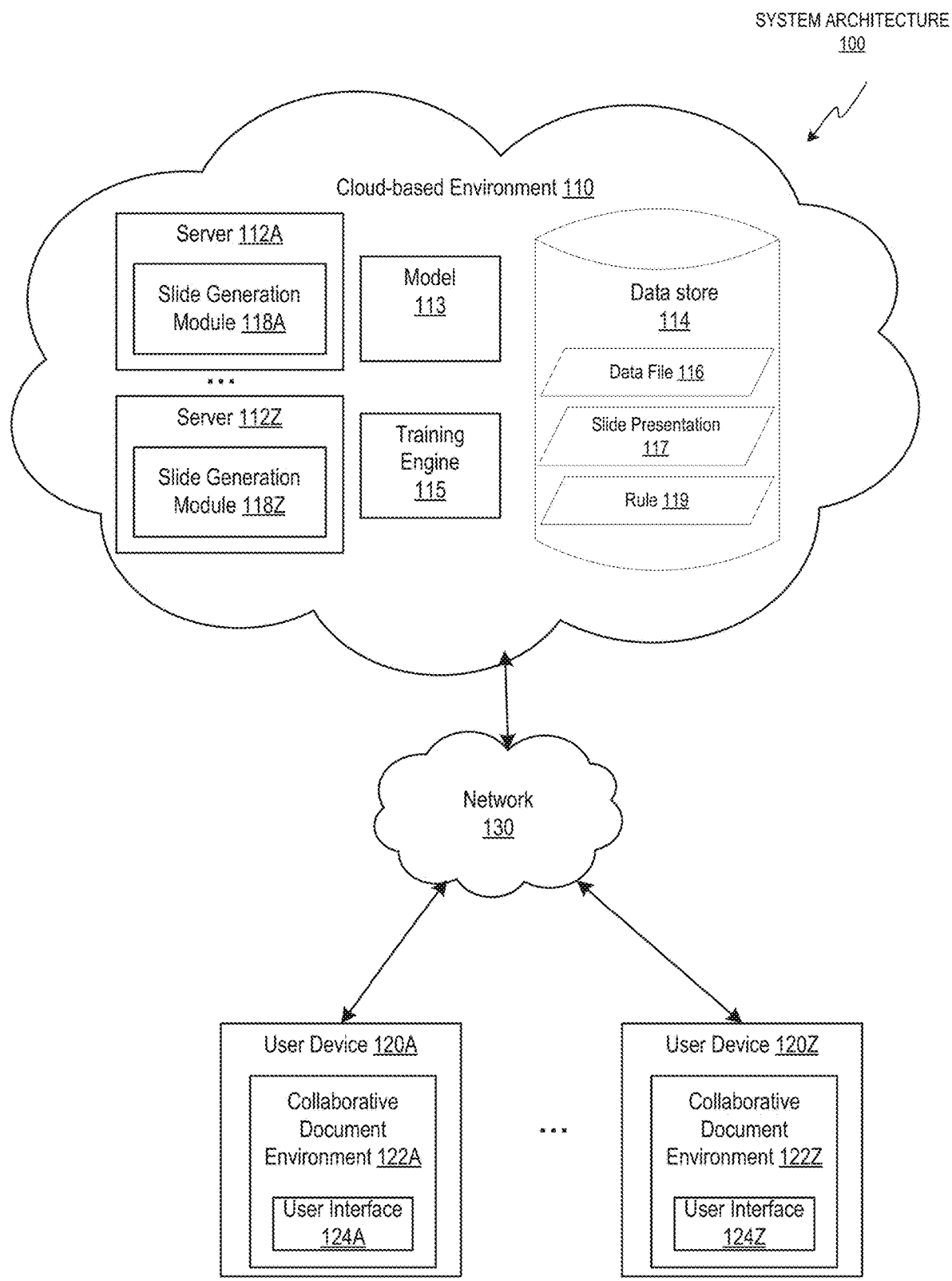
FIG. 1 illustrates an example of a system architecture for implementations of the present disclosure.

Conventionally, there may be numerous actions for a user to perform when parsing source content and creating a slide presentation. For example, the user may have to find and open each of the related data files for a particular topic. The user may have to parse large portions of the source content and select salient points from the source content to include in the slide presentation. The user may have to copy numerous sections of content from the source content to the various slides of the slide presentation. In some cases, the user may select a larger portion of content than is called for to include in a slide to adequately represent a point, fact, statistic, opinion, or the like.

In some instances, the processing speed of a computing device may be slowed down by generation of a slide presentation including a large amount of content and/or network bandwidth may be adversely affected when a slide presentation including a large amount of content is delivered over a network to a user device. Additionally, the user may have to define the structure of the presentation and create logical breakpoints for slides in the presentation. In some instances, the user may create more slides than called for to adequately represent a presentation topic. A larger presentation may result in an increased file size of the presentation which may have adverse effects on processing speed, network bandwidth, or the like. The user may also have to select and apply a consistent and visually appealing design to each slide in the presentation. Accordingly, it should be appreciated that these actions may be tedious for a user and may not be preferable to a performance of a computing device and/or network.

Aspects and implementations of the present disclosure are directed to a collaborative document system that addresses at least these deficiencies, among others, by generating presentation slides with distilled content for a slide presentation. The implementations disclosed herein may be applied to any suitable data file including any suitable content (e.g., text, data tables, images, audio, video, etc.) to generate slides for a slide presentation. For example, one such data file may include an electronic document that is uploaded by a user device or that is created using a collaborative document system.

An electronic document refers to media content used in electronic form. Media content may include text, data tables, videos, images, graphs, slides, charts, software programming code, designs, lists, plans, blueprints, maps, etc. The electronic document may be stored in a cloud-based environment. An electronic document to which users have been granted permission to access and/or edit concurrently may be referred to as a collaborative document herein. With a collaborative document, users may be able to see content changes (e.g., character-by-character) as other collaborators make edits to the document. Although a collaborative document system is described as implementing the disclosed techniques throughout the remainder of the disclosure, it should be noted that any suitable system or application (e.g., local application installed on a user device) may generate slides for a slide presentation based on content in one or more data files.

Collaborative document systems may allow a collaborative document owner to invite other users to join as collaborators with respect to the collaborative document stored in the cloud-based environment. The collaborative document may be provided to user devices of the collaborators by one or more servers in a cloud-based environment. Each collaborator may be associated with a user type (e.g., editor, reviewer, viewer, etc.). Different views and capabilities may be provided to the collaborators based on their user type to enable editing, commenting on, reviewing, or simply viewing the collaborative document. Once granted permission to access the collaborative document, the collaborators may access the collaborative document to perform operations allowed for their user type.

Using the collaborative document system, a user may create or open a collaborative document (e.g., in a web browser) and share the collaborative document with one or more collaborators. In some embodiments, the collaborative document may be a slide presentation that is automatically generated by a slide generation module based on content of one or more of the data files. The slide generation module may receive the one or more data files or selected content of the one or more data files as input and extract certain content from the data file or the selected content. The slide generation module may select one or more layout templates for one or more slides based on the type of content. For example, a layout template including a title may be selected for content that is a title in the data file, a layout template including a section header may be selected for content that is a section header in the data file, and/or a layout template including a title and a body may be selected for content in the data file that includes text, data tables, images, or the like. Accordingly, in some embodiments, the formatting and style in the input data files may be maintained for generated slides that are output by the slide generation module, as discussed further below.

In some implementations, the extracted content may be distilled into distilled content by the slide generation module. Distilling may refer to reducing extracted content from a first amount of content to a second lesser amount of content. For example, distilling may refer to summarizing text included in extracted content from a first number of sentences to a second number of sentences that is less than the first number of sentences. Distilling and summarizing may be used interchangeably herein. In another example, distilling may refer to reducing a data table in extracted content to a selected data range that is a subset of the entire data table. Further, distilling may refer to identifying an image in content and extracting the image from the content. A presentation visualization item including the distilled content may be generated based on a type of the distilled content. For example, a presentation visualization item including a list (e.g., bullet point) may be generated for distilled content having a text type, a presentation visualization item including a data table, a data chart, or a data plot, etc. may be generated for distilled content including a data table, and/or a presentation visualization item including an image may be generated for distilled content including an image.

One example of how the techniques may be used may include a scenario where an employee wants to create a set of slides for an "Overview of Sales of the Fiscal Year." The employee may have a market report, a spreadsheet of sales data, a document of new products, or the like. The employee may upload the documents to the slide generation module for automatic content distilling and slide generation. The slide generation module may distill several sentences from the market report to include in a bullet point list in a first slide. The slide generation module may also distill sales data from a data table in the spreadsheet of sales data and select a data chart to visually illustrate the sales data or select a data table to depict the sales data in a second slide. The slide generation module may also extract an image of a product from the document of new products and may distill text associated with the image of the product to generate a product introduction slide that includes the image and associated text in a third slide.

The disclosed techniques may enhance processing speed by distilling content into reduced content to more efficiently present content from the data files. For example, in some implementations, text in a data file may be summarized into a reduced set of sentences before being represented in a bullet point list in a slide. Distilling the content may reduce the file size of the slide presentation. Also, the techniques may determine logical breakpoints in the content based on headings, formatting, size of the content, etc. to create an efficient number of slides to adequately represent a presentation topic. Network bandwidth may be improved by sending the slide presentation with reduced file size or with the more efficient number of slides over the network. The techniques may also base a structure of the slide presentation on the formatting of one or more data files and apply a consistent theme/design to the slides to enhance the graphical appearance of the slide presentation and maintain a common look and feel between the data files and the slide presentation. Furthermore, by automatically reducing and distilling the content and automatically creating slides for a presentation topic, the disclosed technology increases the reliability of collaborative document systems, and reduces or eliminates the need for manual checking of the results of such techniques.

FIG. 1 is an example of a system architecture 100 for implementations of the present disclosure. The system architecture 100 includes a cloud-based environment 110 connected to user devices 120A-120Z via a network 130. Although the system architecture 100 is described in the context of a cloud-based environment 110, which may enable communication between servers 112A-112Z in the cloud-based environment 110 and with user devices 120A-120Z over the network 130 to store and share data, it should be understood that the implementations described herein may also apply to systems that are locally interconnected. The cloud-based environment 110 refers to a collection of physical machines that host applications (e.g., word processing application, spreadsheet application, slide presentation application) providing one or more services (e.g., word processing, spreadsheet processing, slide generation for inclusion in a slide presentation) to multiple user devices 120A-120Z via the network 130. The network 130 may be public networks (e.g., the Internet), private networks (e.g., a local area network (LAN) or wide area network (WAN)), or a combination thereof. Network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, network 130 may include a wired infrastructure (e.g., Ethernet).

The cloud-based environment 110 may include one or more servers 112A-112Z, a training engine 115, and/or a data store 114. The training engine 115 and/or the data store 114 may be separate from the servers 112A-112Z and communicatively coupled to the servers 112A-112Z or the training engine 115 and/or the data store 114 may be part of one or more of the servers 112A-112Z. The data store 118 may store a data file 116 that may include content (e.g., text, data tables, images, video, audio, etc.). In one embodiment, the data file 116 may be any suitable data file including content that is uploaded to the cloud-based environment 110 by the user devices 120A-120Z or from a server within or outside of the cloud-based environment 110. In another embodiment, the data file 116 may be a collaborative document shared with one or more users. The collaborative document may be a word processing document, a spreadsheet document, or any suitable electronic document (e.g., an electronic document including content such as text, data tables, videos, images, graphs, slides, charts, software programming code, designs, lists, plans, blueprints, maps, etc.) that can be shared with users.

The collaborative document may be created by an author and the author may share the collaborative document with other users (e.g., collaborators). Sharing the collaborative document may refer to granting permission to the other users to access (view and/or edit) the collaborative document. Sharing the collaborative document may include informing the other users of the collaborative document via a message (e.g., email, text message, etc.) including a link to the collaborative document. The level of permissions that each user is granted may be based on the user type of each particular user. For example, a user with an editor user type may be able to open the collaborative document and make changes directly to the collaborative document. As such, numerous collaborators may make changes to the content presented in the collaborative document.

The training engine 115 may include a processing device or devices, such as a computer, microprocessor, logic device or other device or processor that is configured with hardware, firmware, and software to carry out some of the embodiments described herein. The training engine 115 may include or have access to a set of training data files and corresponding summaries for each of the training data files that are used as training data by the training engine 116 to train a machine learning model 113 to perform extraction-based summarization. A machine learning model 113 may refer to a model artifact that is created by the training engine 115 using training inputs and corresponding target outputs. The training inputs may include the set of training data files, and the corresponding target outputs may include summaries for respective training inputs. In some embodiments, the training data files and the corresponding target outputs may include a particular format (e.g., bullet point list). The machine learning model 113 may use the training inputs and target outputs to learn features of words, phrases, or sentences in text that make them good candidates to be included in a summary (distilled content). The features may include the position in the text (e.g., a first sentence may be a topic sentence and provide a good overview of a paragraph, the first few sentences may be relevant, a last sentence may be a conclusion and may be relevant), frequent words or phrases, number of words in sentences, etc. Once trained, the machine learning model 113 may be applied to a new data file 116 to obtain a summary (distilled content) for the new data file 116. In some implementations, distilled content may be used to generate a presentation visualization item for inclusion in a layout template of a new slide. In some implementations, the machine learning model 113 may learn the format of the text to output the distilled content using a particular presentation visualization item (e.g., bullet point list).

The servers 112A-112Z may be physical machines (e.g., server machines, desktop computers, etc.) that each include one or more processing devices communicatively coupled to memory devices and input/output (I/O) devices. The processing devices may include a computer, microprocessor, logic device or other device or processor that is configured with hardware, firmware, and software to carry out some of the embodiments described herein. Each of the servers 112A-112Z may host a slide generation module (118A-118Z). The slide generation modules 118A-118Z may be implemented as computer instructions that are executable by one or more processing devices on each of the servers 112A-112Z. The slide generation modules 118A-118Z may generate slide presentations 117 with slides having content distilled from the one or more data files 116 (e.g., collaborative documents). A user may manually identify one or more of the data files 116 as supporting material to the slide generation module 118A-118Z to use to generate the slide presentation 117, or the user may identify specific portions of content in one or more of the data files 116 as supporting material to the slide generation module 118A-118Z to use to generate the slide presentation 117. The slide presentation 117 may be shared with one or more users and may be a collaborative document.

In some implementations, the slide generation module 118A-118Z may identify a layout template for each slide of the slide presentation 117 based on the content. Various layout templates may include a "Title" layout template for a title of a presentation, a "Section Header" layout template for intermediate headings (e.g., a heading that is not associated with body content), a "Title plus Body" layout template for a parent heading with associated body content (e.g., text, data, image, etc.), the "Title plus Body" layout template for body content without an associated parent heading, and so forth. It should be understood that any suitable layout template may be used.

The slide generation module 118A-118Z may distill the content into distilled content to generate a presentation visualization item based on the distilled content. As noted above, in one embodiment, the slide generation module 118A-118Z may apply the content as input to the machine learning model 113 that is trained to produce the distilled content as a target output. In one embodiment, the slide generation module 118A-118Z may use one or more rules 119 that define heuristics for distilling the content. The rules 119 may be predefined by a developer. The rules 119 may be applied to the content included in the one or more data files 116 for which the slide presentation 117 is generated to distill the content.

For example, if the content is text, one rule 119 may define that the text that is to be included in a slide does not overflow the slide. In such cases, the text may be distilled into different subsets and each subset may be included in a different slide such that the subset of text properly fits within the different slides. The rule 119 may define that complete sentences or an individual bullet point is not broken up when separating the text between slides. Another rule 119 may define using a sentence for a bullet point based on the sentence's position in a paragraph (e.g., a first sentence in a paragraph of text as a bullet point for a slide because the first sentence is likely to be a topic sentence, or using a last sentence in the paragraph as a bullet point because the last sentence is likely to include a conclusion). Another rule 119 may define that frequently appearing words or phrases in a body of text are to be distilled and a single sentence is to be included as a bullet point with the frequently appearing words or phrases while some of the other sentences with less frequently appearing words or phrases are to be ignored. Another rule 119 may define that a maximum number of sentences be distilled for representation in a slide.

If the content is data in a data table, another rule 119 may define that certain column headers in the data table be identified and a range of data associated with those column headers be distilled (e.g., for sales data, the rule 119 may define that data ranges associated with column headers of "sales," "region," etc. be distilled from the data table) while ignoring data in the data table associated with other column headers. Additionally, a rule 119 may define that a data range having a certain size is to be selected to be represented in a data table to fit properly within a slide such that the data table does not overflow the slide. In such a case, the rule may define that another slide be created for the remaining data range not used in the first slide and may define reusing the column headers from the data table in the first slide in the data table in the second slide.

If the content is an image, another rule 119 may define extracting an image from the rest of the content and using the image as the distilled content. Another rule 119 may define using a caption associated with the image as a title of a slide including the image. Additionally, if there is no caption for the image, a rule 119 may define using the text in closest proximity to the image as a title of the slide including the image. Another rule 119 may define including text surrounding an image in a notes section associated with the slide but not actually including the text in the slide itself.

The one or more rules 119 may also define which presentation visualization item to generate based at least on a type of the content in the one or more data files 116. For example, the rules 119 may define generating a list (bullet point) as the presentation visualization item if the content is text, a data table or data chart if the content is data, an image if the content is an image, and so forth. The rules 119 may define including the presentation visualization item in a body portion of the identified layout template for the content.

The slide generation module 118A-118Z may generate the presentation visualization item (e.g., bullet point list, data chart, data table, image, etc.) based on the distilled content. The slide generation modules 118A-118Z may generate the slide presentation 117 having one or more slides with or without a presentation visualization item based on the layout template selected for the particular content. For example, a layout template for "Title" may not include a presentation visualization item, but a layout template for "Title plus Body" may include the presentation visualization item.

One or more of the servers 112A-112Z may provide a collaborative document environment 122A-122Z to the user devices 120A-120Z. The server 112A-112Z selected to provide the collaborative document environment 122A-122Z may be based on certain load-balancing techniques, service level agreements, performance indicators, or the like. The collaborative document environment 122A-122Z may provide a user interface 124A-124Z that displays the slide presentation 117 generated based on content in the one or more data files 116. The collaborative document environment 122A-122Z may enable users using different user devices 120A-120Z to concurrently access the slide presentation 117 to review, edit, view, and/or propose changes to the slide presentation 117 in a respective user interface 124A-124Z. In an implementation, the user interfaces 124A-124Z may be web pages rendered by a web browser and displayed on the user device 120A-120Z in a web browser window. In another implementation, the user interfaces 124A-124Z may be included in a stand-alone application downloaded to the user device 120A-120Z and natively running on the user devices 120A-120Z.

The user devices 120A-120Z may include one or more processing devices communicatively coupled to memory devices and I/O devices. The user devices 120A-120Z may be desktop computers, laptop computers, tablet computers, mobile phones (e.g., smartphones), or any suitable computing device. The user device 120A-120Z may include components, such as an input device and an output device. A user may be authenticated by the server 112A-112Z using a username and password (or other identification information) provided by a user via the user interface 124A-124Z, such that the same user device 120A-120Z may be used by different users at different times. In some implementations, the slide generation module 118A-118Z may be a part of user device 120A-120Z. For example, in some implementations, the user device 120A-120Z may have a locally installed application including the slide generation module 118A-118Z for a user to access, view, edit, and/or automatically generate a slide presentation 117 with distilled content.

Figure 2:
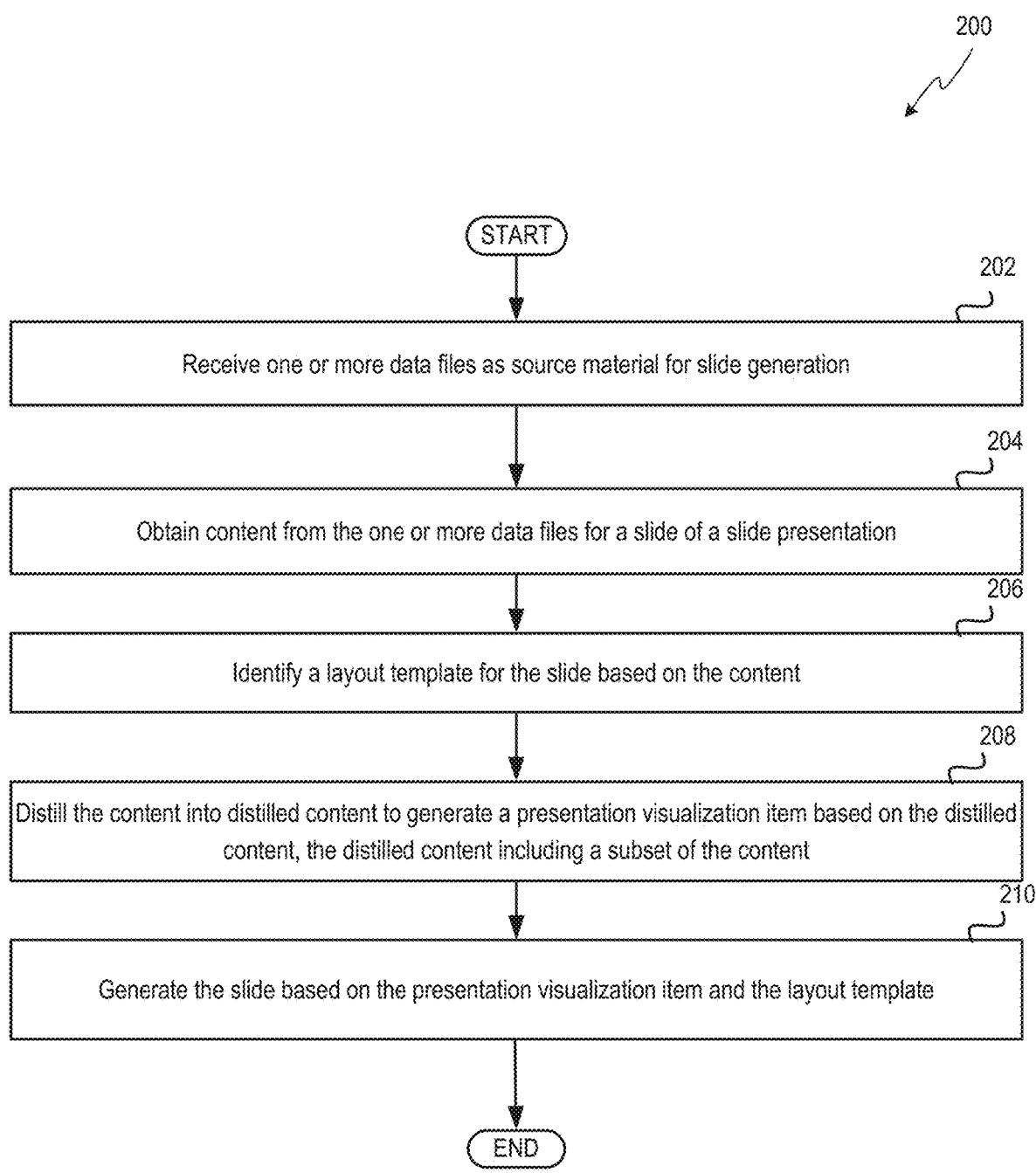
FIG. 2 depicts a flow diagram of aspects of a method for generating a slide including distilled content, in accordance with one implementation of the disclosure.

FIG. 2 depicts a flow diagram of aspects of a method 200 for generating a slide including distilled content, in accordance with one implementation of the disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by one or more slide generation modules 118A-118Z executed by one or more processing devices of the servers 112A-112Z in the cloud-based environment 110. In some implementations, the method 200 may be performed by one or more processing devices of the user devices 120A-120Z executing the slide generation modules 118A-118Z.

Method 200 may begin at block 202. At block 202, the processing device may receive one or more data files 116 as source material for slide generation. In one embodiment, the one or more data files 116 may include collaborative documents (e.g., text document, spreadsheet document, etc.), non-collaborative documents (e.g., text document, spreadsheet document), saved webpages, database files, image files, video files, audio files, animated content, or any suitable media file. The data files 116 may include content, such as text, data tables, images, and so forth. The data files 116 may be uploaded to the cloud-based environment 110 or created using the collaborative document environment 122A and stored in the data store 114.

At block 204, the processing device may obtain content from the one or more data files 116 for a slide of a slide presentation 117. The processing device may parse the data file 116 to identify content and automatically extract the content including any applicable formatting (e.g., titles, section headers, parent headers with body content, etc.) and style, as shown below with reference to FIGS. 4-5. In some embodiments, the content (e.g., a paragraph of text, a data table from a spreadsheet, one or more images) may be selected by a user and the processing device may obtain the user-selected content from the one or more data files 116, as shown below with reference to FIG. 6.

At block 206, the processing device may identify a layout template for the slide based on the content. As discussed above, the layout templates may include a "Title" layout template to depict a title of the presentation topic based on a title or top level heading in the content of the data files 116, a "Section Header" layout template to depict an intermediate heading (e.g., a heading that is not associated with body content), a "Title plus Body" layout template to display body content (e.g., text, data, image, etc.) in a body portion of the slide and a parent heading associated with the body content as a title of the slide. In some instances, the slide generation module 118A-118Z may identify the format of the content to identify the proper layout template. Accordingly, the formatting of the data files 116 may be maintained for the slide presentation 117.

For example, titles, headings, body content, etc. may be identified in the content by parsing the document and/or using metadata of the data file 116. If content includes a title, then the "Title" layout template may be identified and selected for the text of the title. If content includes an intermediate heading (e.g., a section heading that is not associated with body content), then the "Section Header" layout template may be identified and selected for the text of the particular intermediate heading. If the content includes body content with an associated parent heading, then the "Title plus Body" layout template may be identified and selected and, upon distilling, the body content may be included in the body of the slide and the text of the parent heading may be included in the title of the slide. For example, if the content includes a parent heading and associated text (e.g., bullet points), the text of the parent heading may be extracted and set to the title of slide and the text may be designated for the body of the slide after the text is distilled. If the content includes body content without an associated parent heading, then a title may be automatically selected based on the body content. For example, the rules 119 may define certain keywords to search for in the content that may be selected and used as the title.

At block 208, the processing device may distill the content into distilled content to generate a presentation visualization item based on the distilled content. The processing device may apply the machine learning model 113 or the rules 119 to obtain the distilled content. The distilled content includes a subset of the original content. The presentation visualization item that is generated may be based on application of one of the rules 119. For example, when the layout template is "Title and Body" and the content includes text with an associated parent heading, the rules 119 may define selecting a presentation visualization item of a bullet point list to generate and representing the distilled text in the bullet point list in the body of the layout template, and the text of the parent heading may be set to the title of the layout template for the slide.

In some embodiments, the original content may be distilled by applying the machine learning model 113 to the original content. The machine learning model 113 may be trained to select certain features (e.g., sentences in certain positions in the paragraphs, frequently used words or phrases, etc.) from the content and output the distilled content, as described above. In some implementations, the machine learning model 113 may output the distilled content using a particular presentation visualization item (e.g., bullet point list). In some implementations, the one or more rules 119 may define which presentation visualization item to use for the distilled content. For example, a bullet point list may be generated for distilled content including text.

In some embodiments, the original content may be distilled in accordance with the rules 119. For example, the rules 119 may define selecting a subset of sentences (e.g., maximum number) from the content to distill the content for representation in a presentation visualization item (e.g., bullet point list). The rules 119 may also define which sentences to select based on their position in a paragraph (e.g., a first sentence in a paragraph, the first two or three (any number) of sentences in a paragraph, the last sentence in a paragraph), based on frequently used words or phrases, or the like. The rules 119 may also define a range of data to select from a data table when the content includes a data table and may define the presentation visualization item (e.g., data chart, data table) to select to represent the range of data. For example, the rules 119 may define which column headers to search for when selecting the data range, and when the column headers are found, the rules 119 may define a range of data associated with the column headers to select. Further, when certain column headers are found, there may be a mapping from the column header to a particular data chart. For example, a column header of "sales" may be mapped to a bar chart. The rules 119 may also define how to extract an image when the content includes an image (e.g., extract the image as a single object without cropping the image).

At block 210, the processing device may generate a slide based on the presentation visualization item and the layout template. For example, a slide may be generated having a layout template of "Title and Body" and a presentation visualization item of a bullet point list including distilled sentences from original text may be included in the body of the layout template and the text of a parent heading associated with the distilled sentences may be included in the title of the layout template used for the slide. A default theme may be applied to each of the slides of a slide presentation 117 to provide consistency and an enhanced look and feel to the slide presentation 117. The user may configure the default theme and/or modify the theme of the slide presentation 117 once created.

In some embodiments, the original content (e.g., paragraphs of text or original data table) may be kept in a notes section of the slide including the corresponding distilled content. The notes section may provide further context to the presenter during the presentation. Additionally, in some embodiments, the processing device may receive a user interaction with the generated slide. The processing device may use the user interaction (e.g., any edits, modifications, reformatting, etc.) to update or create new rules 119 for defining heuristics about how to generate subsequent slides for the particular user. For example, a user-preferred font type, size or color of font, paragraph formatting, bullet point style, etc. may be captured for a particular layout template. As another example, if the user rewrites an automatically distilled bullet point sentence in a slide, similar language may be stored and applied throughout other slides, as well. Alternatively, the processing device may update (re-train) the machine learning model 113 based on the user interaction.

In some implementations, participant feedback may be obtained to improve the slide presentations 117. For example, the participant feedback may be provided via a rating system for the presentation. In some implementations, participants' engagement and reaction data may be recorded (e.g., where/which slide the users spend the most time on, which slide the users have the most comments on or messages about, etc.). The processing device may generate subsequent slides including similar layout template, distilled content, design/theme, style, or the like based on the participants' engagement and reaction data.

In some embodiments, the processing device may obtain second content (e.g., text, data, image, etc.) from the one or more data files 116 for a second slide of the slide presentation 117. The processing device may identify a second layout template for the second slide based on the second content. The second layout template may be different than the layout template selected for the first slide depending on the type of the second content. The processing device may distill the second content into second distilled content to generate a second presentation visualization item based on the second distilled content. The machine learning model 113 or the rules 119 may be applied to the second content to distill the second content. The second distilled content may include a subset of the second content. The processing device may generate a second slide based on the second presentation visualization item and the second layout template. It should be understood that this process may continue to generate as many slides as appropriate until the content of the one or more data files 116 is included in respective slides of the slide presentation 117.

Figure 3:
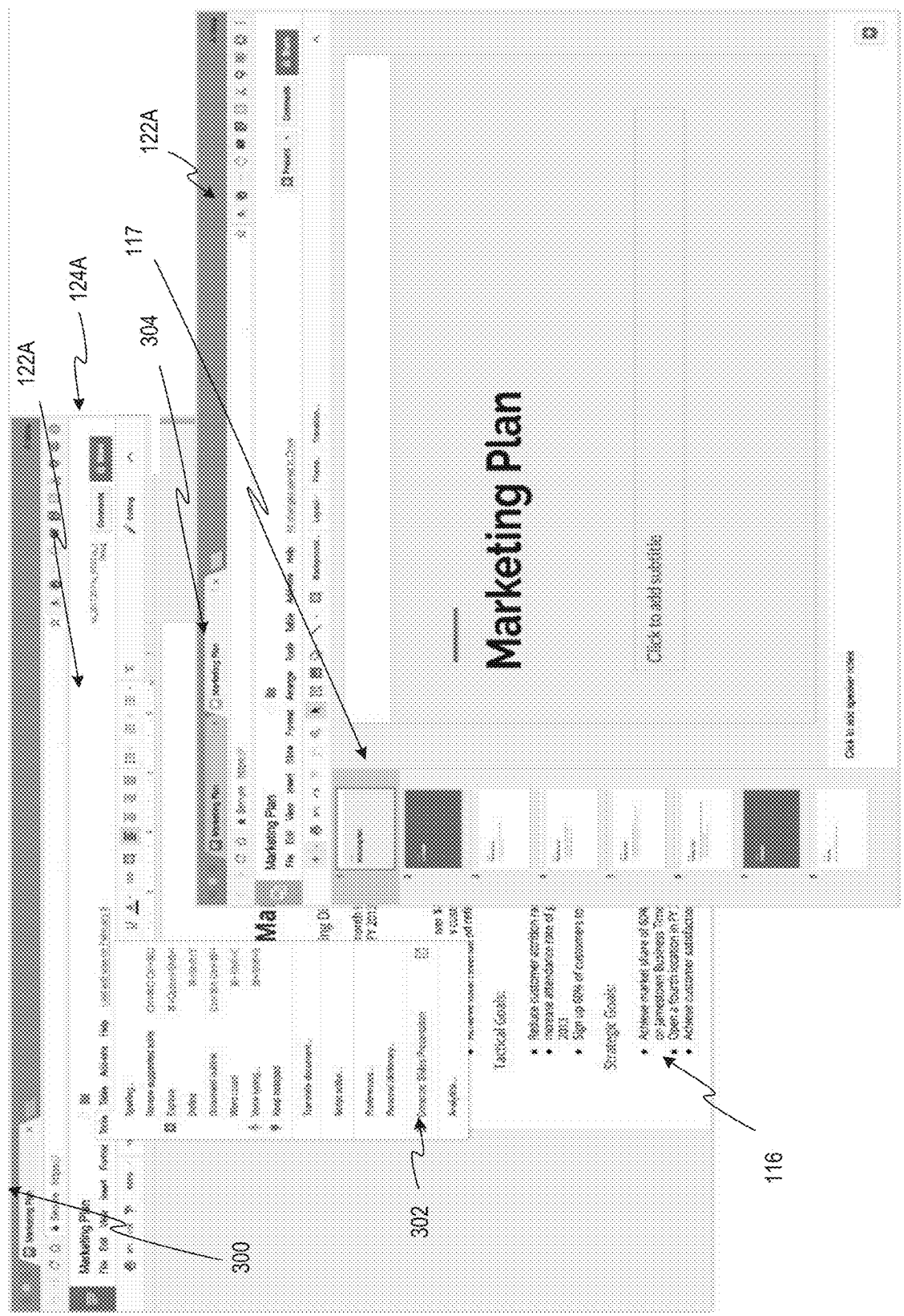
FIG. 3 illustrates an example slide presentation including a set of slides generated from a data file, according to an illustrative implementation.

FIG. 3 illustrates an example a slide presentation 117 including a set of slides generated from a data file 116, according to an illustrative implementation. As depicted, a collaborative document environment 122A is provided from a server 112A and displayed via the user interface 124A. The data file 116 is open in a collaborative word processing application provided by the collaborative document environment 122A in a first browser window 300. It should be understood that the collaborative document environment 122A may be displayed in the user interface 124A of a native application on the user device 124A without using a browser. The data file 116 depicted includes text (e.g., a title, section headers, parent headers with associated body text, etc.).

The user may access a file menu option ("Tools") and select an option (e.g., link) 302 ("Generate Slide Presentation") to generate a slide presentation 117 using the opened data file 116. Upon selecting the option 302, the data file 116 may be received by the slide generation module 118A as source material for slide generation. The slide generation module 118A may obtain content from the data file 116 by identifying and extracting the content. In some instances, the formatting of the content may be obtained. For example, the slide generation module 118A may determine formatting information (e.g., titles, section headers, parent headers associated with content, content, etc.) associated with the content. The slide generation module 118A may identify a layout template for various portions of the text. For example, the various portions may be determined based on the formatting information.

Different layout templates may be selected for the various portions. For example, a "Title" layout template may be selected for a portion of the text having formatting information indicating the text is a title, a "Section Header" layout template may be selected for a portion of the text having formatting information indicating the text is a section header (e.g., a header not associated with body content), a "Title plus Body" layout template may be selected for a portion of text having formatting information indicating the text includes a parent header and body text associated with the parent header, and so forth. The slide generation module 118A may distill the content into distilled content to generate a presentation visualization item based on the distilled content.

The slide generation module 118A may generate one or more slides to include in the slide presentation 117 based on the layout template and/or presentation visualization item. As depicted, the slide presentation 117 is displayed by a collaborative slideshow application in a second browser window 304 separate from the collaborative word processing application displayed in the first browser window 300. The slides in the slide presentation 117 with a layout template of "Title plus Body" may include a presentation visualization item of a list including distilled text, as described in more detail below.

Figure 4:
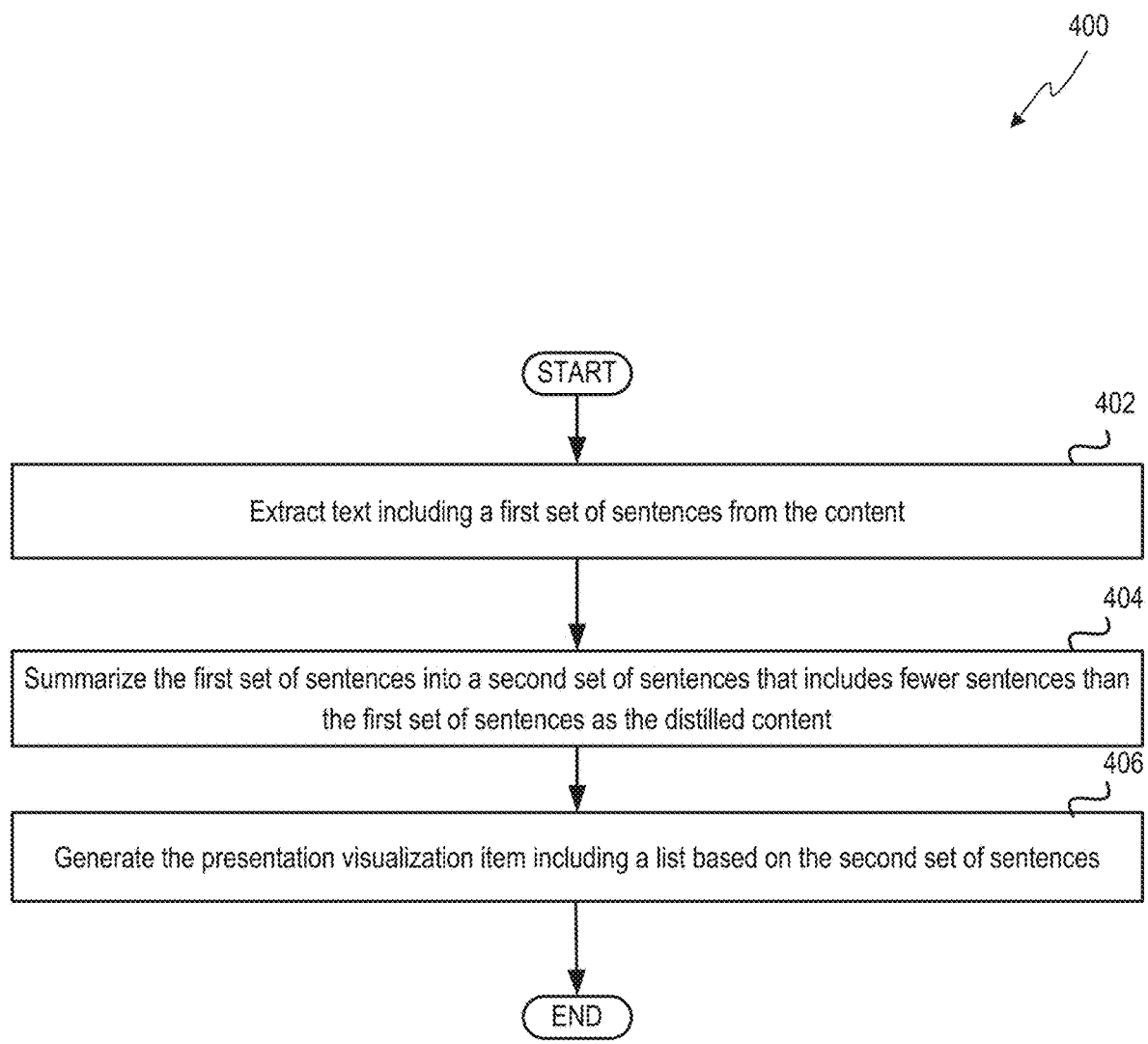
FIG. 4 depicts a flow diagram of aspects of a method for representing summarized text in a list in a slide, in accordance with one implementation of the disclosure.

FIG. 4 depicts a flow diagram of aspects of a method 400 for representing summarized text in a list in a slide, in accordance with one implementation of the disclosure. Method 400 may be performed in the same or a similar manner as described above in regards to method 200. In one implementation, method 400 may be performed by one or more slide generation modules 118A-118Z executed by one or more processing devices of the servers 112A-112Z in the cloud-based environment 110. In some implementations, the method 400 may be performed by one or more processing devices of the user devices 120A-120Z executing the slide generation modules 118A-118Z.

The processing device may have received one or more data files 116 and extracted content from the one or more data files 116 prior to method 400 beginning. Alternatively, the processing device may have received a selection of content from the one or more data files 116 prior to method 400 beginning. The content may include text (e.g., one or more parent headers, paragraphs of text or bullet points including sentences, etc.).

Method 400 may begin at block 402. At block 402, the processing device may extract text including a first set of sentences from the content. The first set of sentences may be in paragraph form or may be represented in a list (e.g., a bullet point list). At block 404, the processing device may summarize the first set of sentences into a second set of sentences as the distilled content. The second set of sentences may include fewer sentences than the first set of sentences. The summarizing may be performed by applying the machine learning model 113 to the first set of sentences or by applying the one or more rules 119 to the first set of sentences. At block 406, the processing device may generate a presentation visualization item including a list (e.g., bullet point) based on the second set of sentences. For example, each sentence in the second set of sentences may be represented as a separate entry (e.g., bullet point) in the list.

Figure 5:
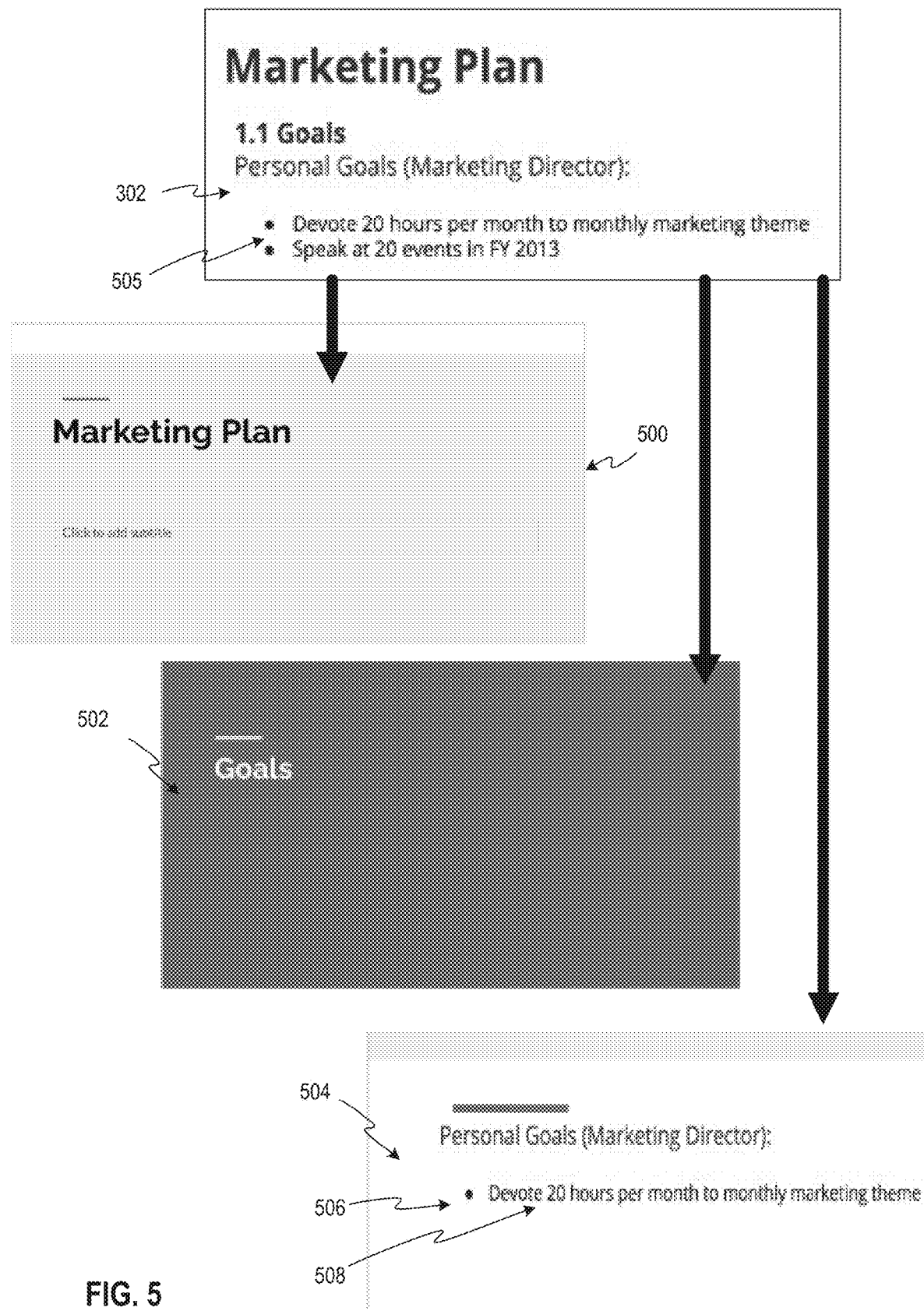
FIG. 5 illustrates more detailed examples of slides in the slide presentation generated from the data file, according to an illustrative implementation.

FIG. 5 illustrates more detailed examples of slides 500, 502, 504 in a slide presentation 117 generated from the data file 116, according to an illustrative implementation. As depicted, the data file includes text content that is formatted with a title ("Marketing Plan"), a section header ("Goals") that is not associated with body content, and a parent header ("Personal Goals (Marketing Director)") that is associated with original body text 505. The original body text 505 includes two sentences ("Devote 20 hours per month to monthly marketing theme," and "Speak at 20 events in FY 2013") represented in a bullet point list.

The slide generation module 118A may receive the data file 116, extract the content, and generate slides 500, 502, and 504. The slide generation module 118A may identify layout templates for the various portions of text in the data file 116. For example, for the title ("Marketing Plan") portion, the "Title" layout template is selected and the text of the title portion is set to the title in the layout template depicted in slide 500. For the section header ("Goals") portion, the "Section Header" layout template is selected and the text of the section header is set to the title in the layout template depicted in 502. For the parent header ("Personal Goals (Marketing Director)") and associated text portion, the "Title plus Body" layout template is identified and the text of the parent header is set to the title of the slide 504 and the associated text is set to the body of the slide 504. Accordingly, each slide 500, 502, and 504 includes different portions of the text from the data file 116 and different layout templates. In this way, the structure of the slide presentation 117 may map to the formatting of the original data file 116.

As depicted in slide 504, a presentation visualization item 506 is generated using distilled content 508. In this example, the presentation visualization item 506 is a bullet point list, but it should be understood that any suitable list or presentation visualization item may be used. The presentation visualization item 506 is included in the body of the layout template. The distilled text 508 may be generated by applying the machine learning model 113 or the rules 119 to the original body text 505. The distilled text 508 includes a fewer number of sentences than the original body text 505.

Figure 6:
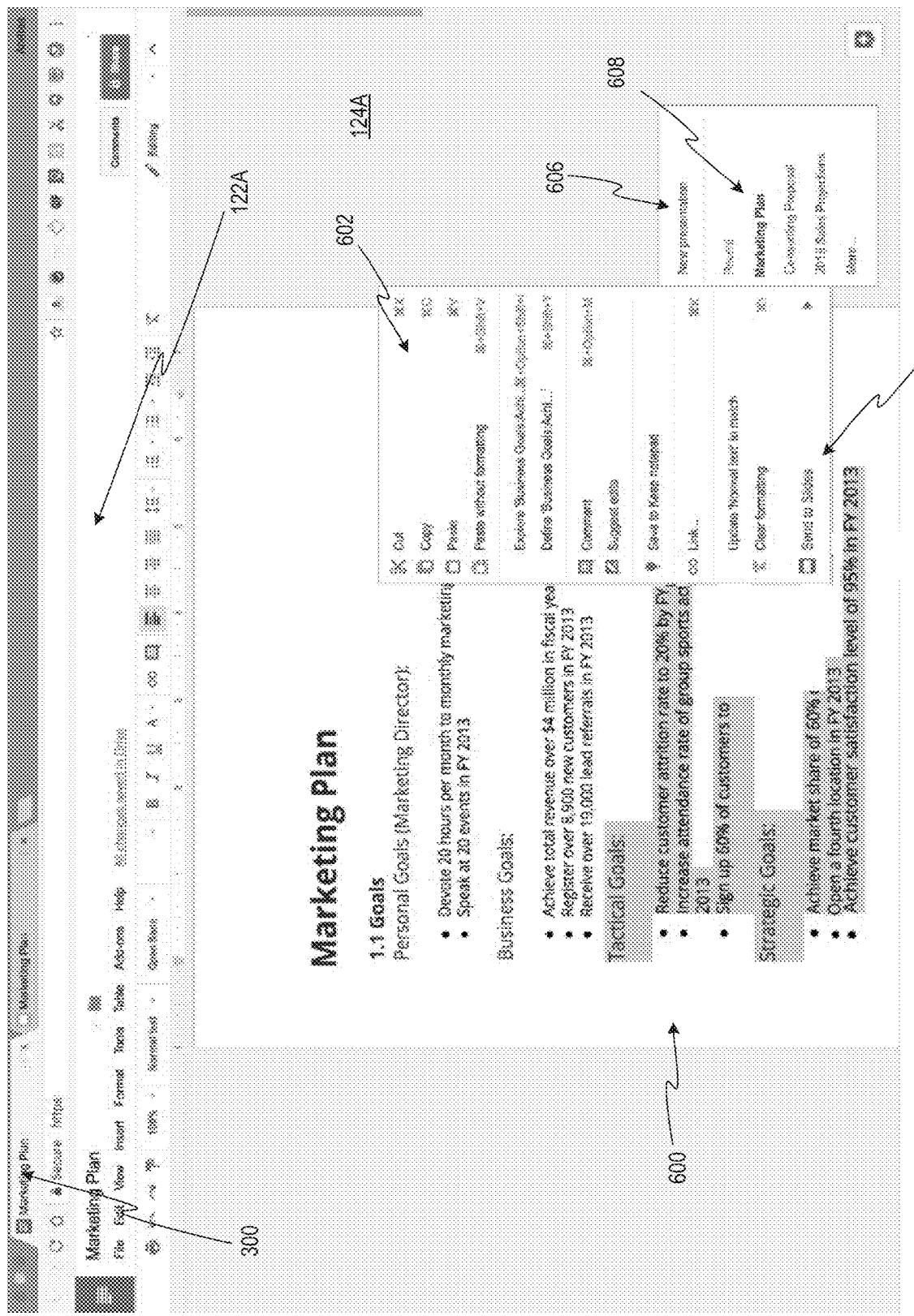
FIG. 6 illustrates an example of sending a selected portion of content to a slide presentation from a data file, according to an illustrative implementation.

FIG. 6 illustrates an example of how a portion of content can be selected to be sent to a slide presentation 117 from a data file 116, according to an illustrative implementation. As depicted, the data file 116 is a collaborative word processing document that is displayed by a collaborative word processing application of the collaborative document environment 122A in the first browser window 300 of the user interface 124A. In some instances, the user may desire to just create slides for some of the content in the data file 116. Accordingly, the user may select (e.g., highlight) a text portion 600. In the depicted example, the text portion 600 includes a first parent header ("Tactical Goals") and associated body text (three sentences represented in a bullet point list) and a second parent header ("Strategic Goals") and associated body text (three sentences). Upon selecting the text portion 600 or upon receiving an input from an input peripheral (e.g., selection of a mouse button), an option menu 602 may appear. From the option menu 602, a user may select an option (e.g., link) 604 ("Send to Slides") and another option menu 606 that includes available slide presentations 117 may appear. The option menu 606 may also enable the user to create a new slide presentation 117 using the selected text portion 600. From the option menu 606, the user can select link 608 to send the selected text portion 600 to a desired slide presentation 117 ("Marketing Plan").

The slide generation module 118A may receive the selected text portion 600 and may identify a layout template for the text portion 600. In some embodiments, the slide generation module 118A may determine that the formatting information for the selected text portion 600 indicates that there are two different parent headers with two respective bodies of text. Accordingly, the slide generation module 118A may divide the single selection of the text portion 600 into two slides.

Figure 7:
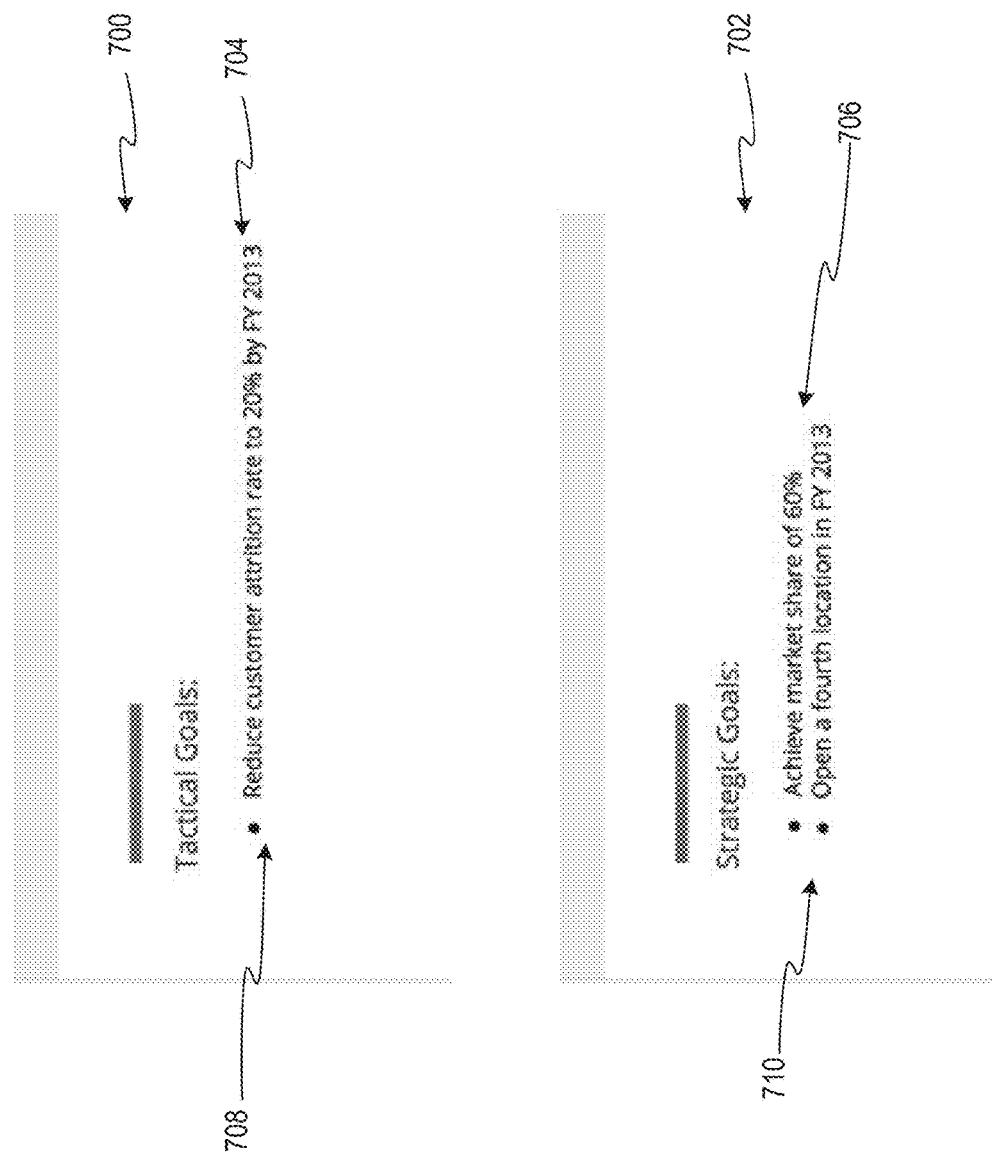
FIG. 7 illustrates an example of receiving selected content and dividing the selected content into separate slides, according to an illustrative implementation.

For example, FIG. 7 illustrates an example of receiving selected content (text portion 600) and dividing the selected content into separate slides 700 and 702, according to an illustrative implementation. The parent headers may be used as logical breakpoints for dividing the selected content into the separate slides 700 and 702. The layout template for the slide 700 may be the "Title plus Body" where the parent header ("Tactical Goal") is set to the title of the slide 700 and the body text associated with the parent header is set to the body in the slide 700. Also, the layout template for the slide 702 may be the "Title plus Body" where the parent header ("Strategic Goals") is set to the title of the slide 702 and the body text associated with the parent header is set to the body in the slide 702. More specifically, the body texts may both be distilled into distilled text 704 and 706 by applying the machine learning model 113 or the rules 119, and a presentation visualization item 708 and 710 (e.g., bullet point lists) may be generated based on the distilled text 704 and 706. It should be understood that both distilled texts 704 and 706 include fewer sentences than their corresponding original text in the data file 116 in FIG. 6.

Figure 8:
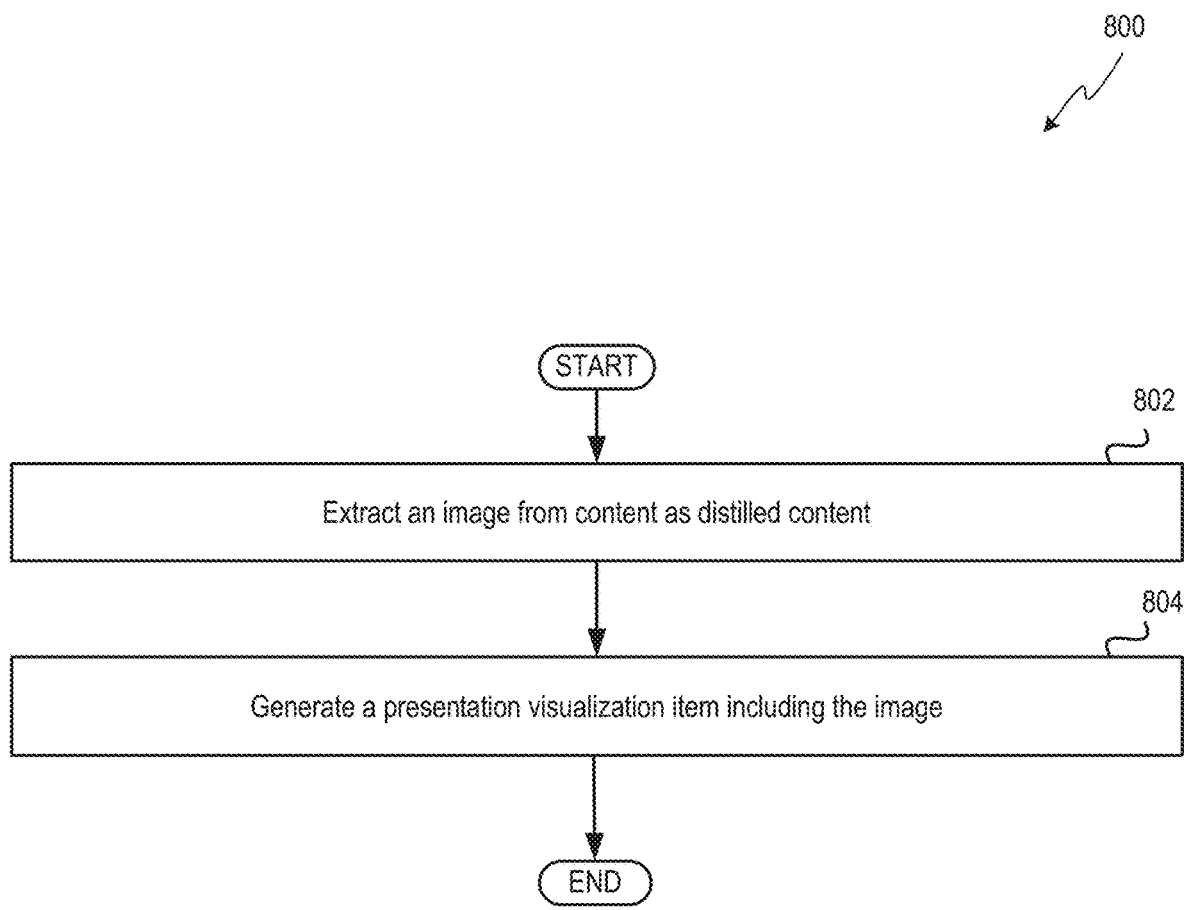
FIG. 8 depicts a flow diagram of aspects of a method for representing an image and text associated with the image extracted from source material in a slide, in accordance with one implementation of the disclosure.

FIG. 8 depicts a flow diagram of aspects of a method for representing an image and text associated with the image extracted from source material in a slide, in accordance with one implementation of the disclosure. Method 800 may be performed in the same or a similar manner as described above in regards to method 200. In one implementation, method 800 may be performed by one or more slide generation modules 118A-118Z executed by one or more processing devices of the servers 112A-112Z in the cloud-based environment 110. In some implementations, the method 800 may be performed by one or more processing devices of the user devices 120A-120Z executing the slide generation modules 118A-118Z.

The processing device may have received one or more data files 116 and extracted content from the one or more data files 116 prior to method 800 beginning. Alternatively, the processing device may have received a selection of content from the one or more data files 116 prior to method 800 beginning. The content may include an image and text associated with the image.

Method 800 may begin at block 802. At block 802, the processing device may extract an image from content as distilled content. The image may be identified by the processing device while the processing device is parsing the data file 116. One or more rules 119 may be applied to the image that define how to extract the image. For example, the rules 119 may define that the image is to be extracted as a single object and should not be cropped. The rules 119 may also define how the image should be sized to fit properly within the body of a layout template (e.g., "Title plus Body"). At block 804, the processing device may generate a presentation visualization item including the image.

Figure 9:
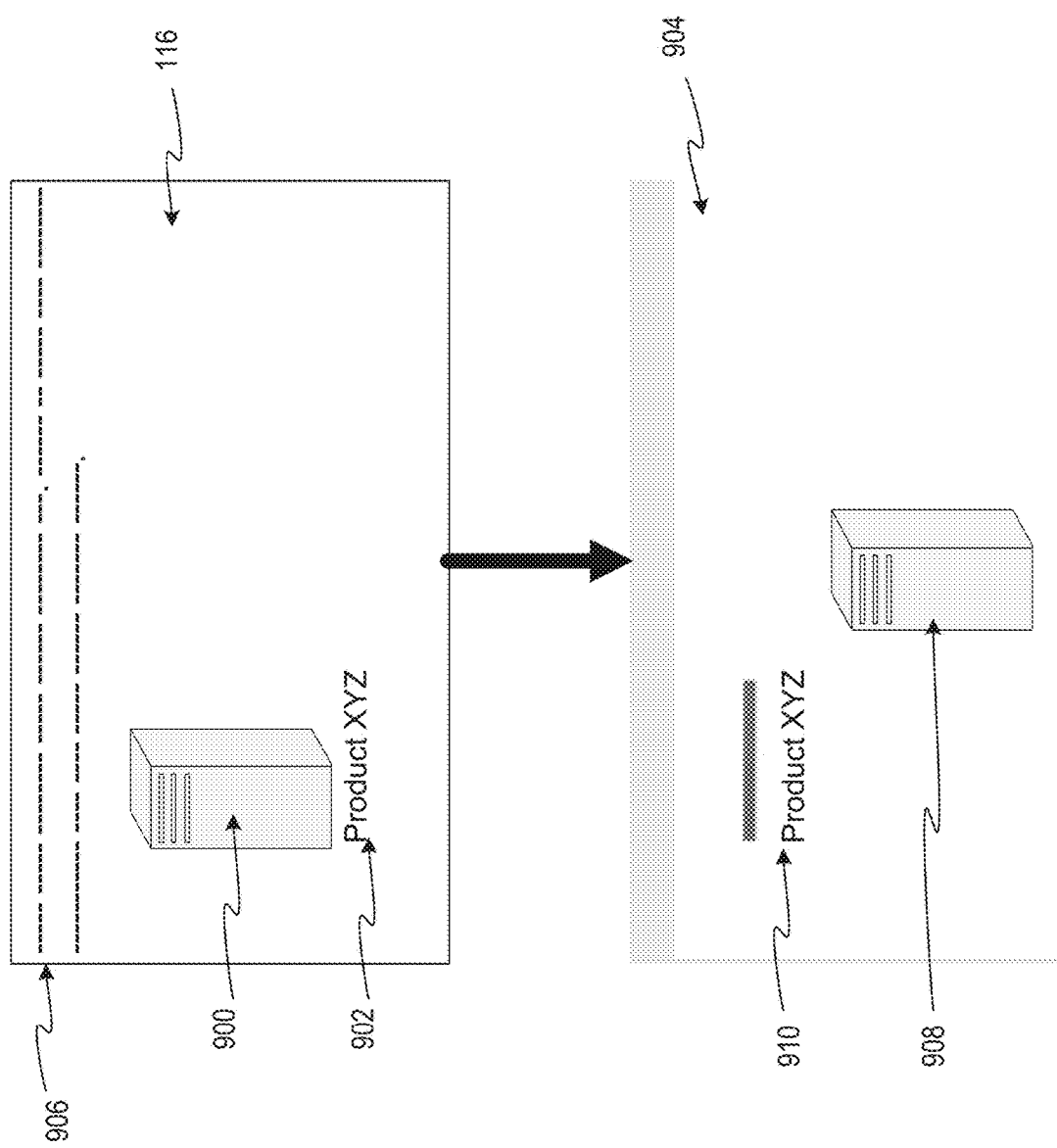
FIG. 9 illustrates an example of representing an image and text associated with the image extracted from source material in a slide, according to an illustrative implementation.

FIG. 9 illustrates an example of representing an image 900 and text 902 associated with the image 900 extracted from a data file 116 in a slide 904, according to an illustrative implementation. The depicted data file 116 includes various text 906 describing the image 900 and a caption 902 ("Product XYZ") associated with the image 900. The slide generation module 118A may identify and extract the image 900 as distilled content from the data file 116 and identify a layout template ("Title plus Body") for the distilled content. The slide generation module 118A may generate a presentation visualization item 908 including the image 900 that is extracted and sized according to one or more rules 119. The presentation visualization item 908 may be included in the body of the layout template.

In some embodiments, certain text in the data file 116 may be extracted and set to a title 910 of the slide 904 including the image 902. For example, the caption 902 may be extracted and set to the title 910 of the slide 904, as depicted. If a caption is not present in the data file 116, one or more words, phrases, or sentences of the various text 906 that describes the product may be extracted and set to the title 910 of the slide 904.

Figure 10:
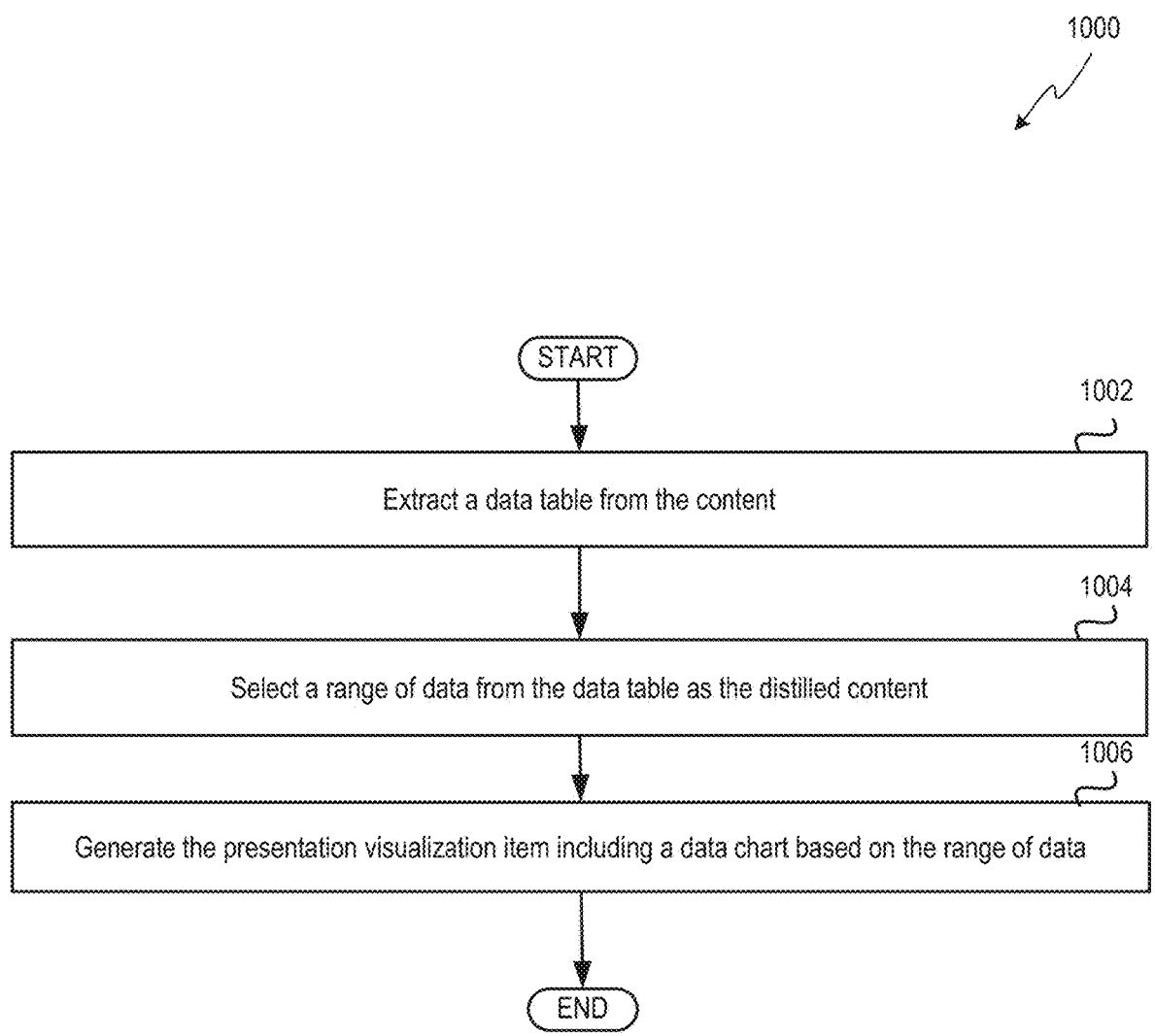
FIG. 10 depicts a flow diagram of aspects of a method for representing an extracted range of data in a data chart in a slide, in accordance with one implementation of the disclosure.

FIG. 10 depicts a flow diagram of aspects of a method 1000 for representing an extracted range of data in a data chart in a slide, in accordance with one implementation of the disclosure. Method 1000 may be performed in the same or a similar manner as described above in regards to method 200. In one implementation, method 1000 may be performed by one or more slide generation modules 118A-118Z executed by one or more processing devices of the servers 112A-112Z in the cloud-based environment 110. In some implementations, the method 1000 may be performed by one or more processing devices of the user devices 120A-120Z executing the slide generation modules 118A-118Z.

The processing device may have received one or more data files 116 and extracted content from the one or more data files 116 prior to method 1000 beginning. Alternatively, the processing device may have received a selection of content from the one or more data files 116 prior to method 400 beginning. The content may include a data table including data.

Figure 11:
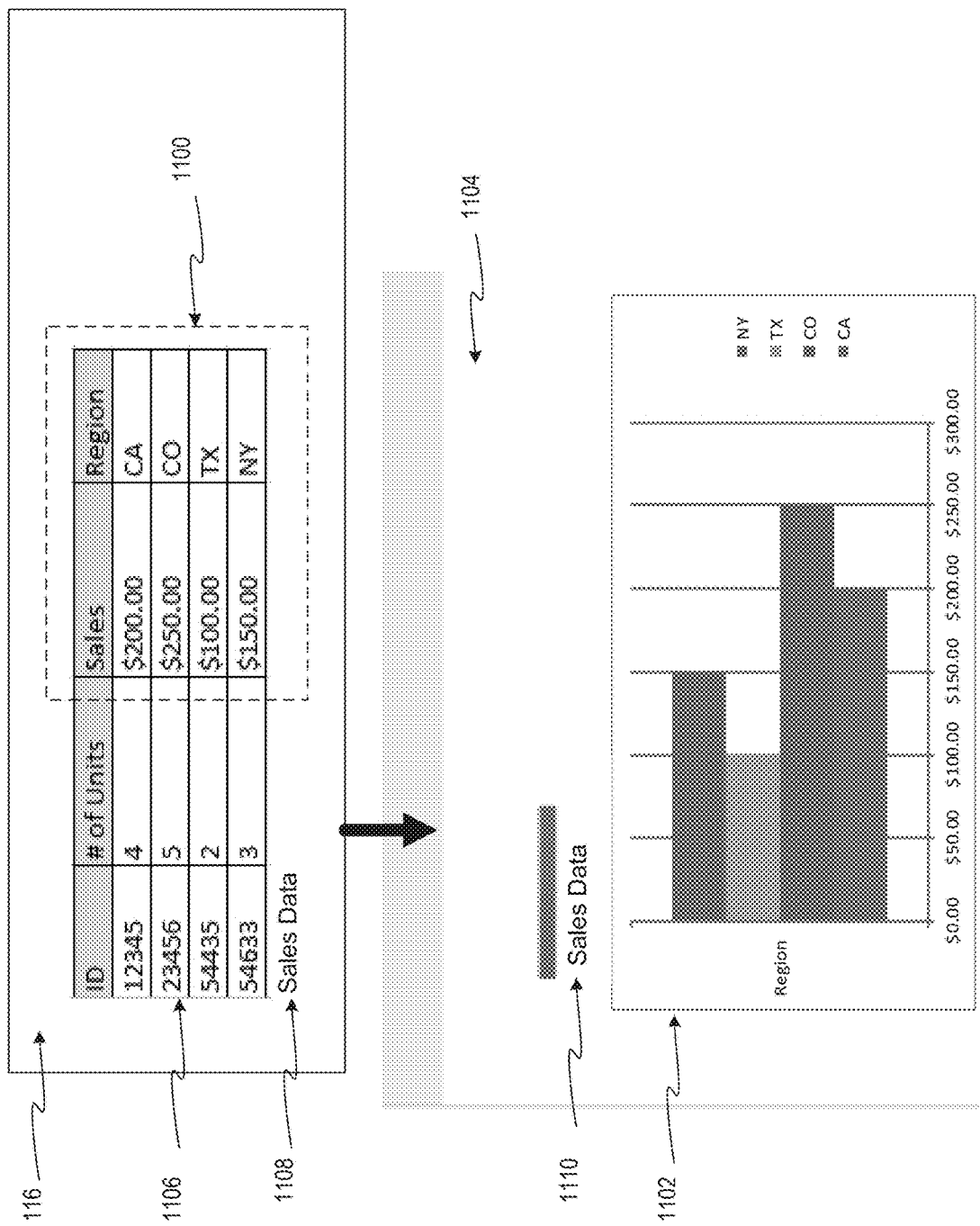
FIG. 11 illustrates an example of representing an extracted range of data in a data chart in a slide, according to an illustrative implementation.
Figure 12:
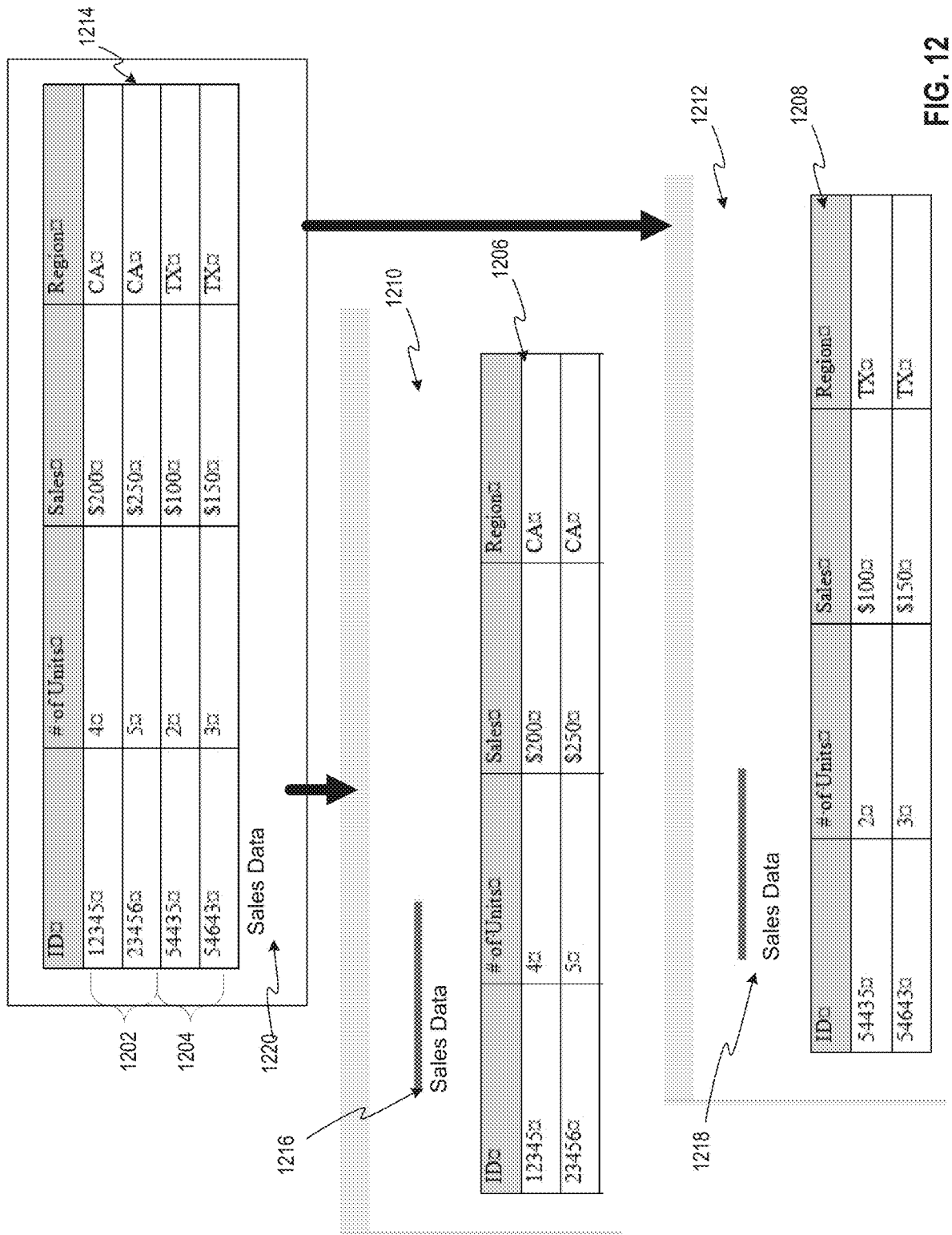
FIG. 12 illustrates an example of representing different extracted ranges of data in data tables in different slides, according to an illustrative implementation.

Method 1000 may begin at block 1002. At block 1002, the processing device may extract a data table from the content. At block 1004, the processing device may select the range of data from the data table as the distilled content. One or more rules 119 may be applied to the data table of the content to select the data range. The one or more rules 119 may define which column headers to search for in the data table, and if found, the range of data to extract. The rules 119 may also define which data chart to use based on a mapping between the data chart and the identified column headers, as depicted in FIG. 11. The one or more rules 119 may also define a maximum number of rows that may be selected to fit properly within a data table in a slide and a range of data may be selected accordingly. Any excess rows may be included in a separate data table in one or more other slides, as depicted in FIG. 12. At block 1006, the processing device may generate a presentation visualization item including data chart based on the range of data.

FIG. 11 illustrates an example of representing an extracted range of data 1100 in a data chart 1102 in a slide 1104, according to an illustrative implementation. The depicted data file 116 includes a data table 1106. The slide generation module 118A may identify and extract the data table 1106 and apply one or more rules 119 to the data table 1106. The one or more rules 119 may define that a range of data 1100 associated with certain column headers (e.g., "Sales" and "Region") should be extracted. The column headers that are defined may be relevant to presenting one or more criteria (e.g., sales, finances, inventor, products, etc.) about an entity. A caption 1108 may also be associated with the data table 1106 in the data file 116. The slide generation module 118A may select the data range 1100 as the distilled content from the extracted data table 1106 to generate a presentation visualization item including the data chart 1102 based on the data range 1100. As depicted, the data chart includes the Regions and the Sales data associated with each Region. In one example, a bar chart was selected based on a rule 119 that defines a mapping between a bar chart and column headers related to sales information (e.g., "Sales," "Region"). The presentation visualization item including the data chart 1102 may be included in the body of the layout template ("Title plus Body") used to generate the slide 1104.

In some embodiments, certain text in the data file 116 may be extracted and set to a title 1110 of the slide 1104 including the data chart 1102. For example, the caption 1108 may be extracted and set to the title 1110 of the slide 1104, as depicted. If a caption is not present in the data file 116, one or more words, phrases, or sentences of text that is in close proximity to the data table 1106 in the data file 116 may be extracted and set to the title 1110 of the slide 904.

FIG. 12 illustrates an example of representing different extracted ranges of data 1202 and 1204 in data tables 1206 and 1208 in different slides 1210 and 1212, according to an illustrative implementation. The depicted data file 116 includes a data table 1214. The slide generation module 118A may identify and extract the data table 1214 and apply one or more rules 119 to the data table 1214. The one or more rules 119 may define that a maximum number of rows be selected to fit properly in a slide. In the depicted example, the maximum number of rows is two but it should be understood that any suitable number may be used. The first range of data 1202 is selected with two rows and a presentation visualization item including the data table 1206 is generated based on the first range of data 1202. The second range of data 1204 is selected with two rows and a presentation visualization item including the data table 1208 is generated based on the second range of data 1204. In other embodiments, the rules 119 may define that the data ranges are selected from the data table based on matching values for particular columns. For example, the range of data including values of "CA" for "Region" column may be selected as the first range of data 1202 and the range of data including values of "TX" for "Region" column may be selected as the second range of data 1204. The rules 119 may define that the column headers are used for both data tables 1206 and 1208. The presentation visualization items including the data tables 1206 and 1208 may be included in the body of the layout template ("Title plus Body") used to generate the respective slides 1210 and 1212.

In some embodiments, certain text in the data file 116 may be extracted and set to titles 1216 and 1218 of the slides 1210 and 1212 including the data tables 1206 and 1208. For example, a caption 1220 for the data table 1214 in the data file 116 may be extracted and set to the titles 1216 and 1218 of the slides 1210 and 1212, as depicted. If a caption is not present in the data file 116, one or more words, phrases, or sentences of text that is in close proximity to the data table 1214 in the data file 116 may be extracted and set to the titles 1216 and 1218 of the slides 1210 and 1212.

Figure 13:
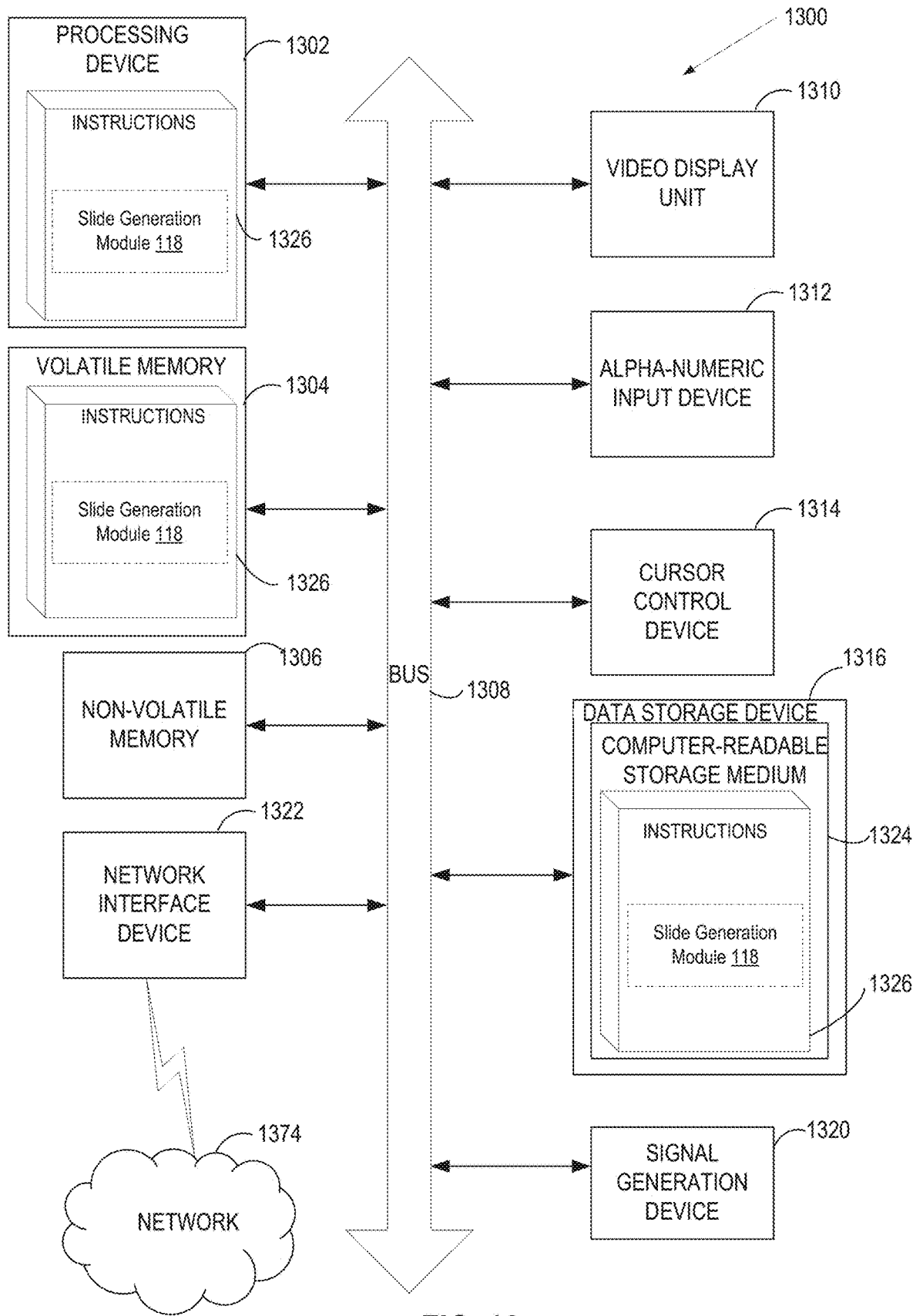
FIG. 13 depicts a block diagram of an example computing system operating in accordance with one or more aspects of the present disclosure.

FIG. 13 depicts a block diagram of an example computing system operating in accordance with one or more aspects of the present disclosure. In various illustrative examples, computer system 1300 may correspond to any of the computing devices within system architecture 100 of FIG. 1. In one implementation, the computer system 1300 may be each of the servers 112A-112Z or the training engine 115. In another implementation, the computer system 1300 may be each of the user devices 120A-120Z.

In certain implementations, computer system 1300 may be connected (e.g., via a network, such as a Local Area Network (LAN), an intranet, an extranet, or the Internet) to other computer systems. Computer system 1300 may operate in the capacity of a server or a client computer in a client-server environment, or as a peer computer in a peer-to-peer or distributed network environment. Computer system 1300 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1300 may include a processing device 1302, a volatile memory 1304 (e.g., random access memory (RAM)), a non-volatile memory 1306 (e.g., read-only memory (ROM) or electrically-erasable programmable ROM (EEPROM)), and a data storage device 1316, which may communicate with each other via a bus 1308.

Processing device 1302 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1300 may further include a network interface device 1322. Computer system 1300 also may include a video display unit 1310 (e.g., an LCD), an alphanumeric input device 1312 (e.g., a keyboard), a cursor control device 1314 (e.g., a mouse), and a signal generation device 1320.

Data storage device 1316 may include a non-transitory computer-readable storage medium 1324 on which may store instructions 1326 encoding any one or more of the methods or functions described herein, including instructions implementing the slide generation module 118 (118A-118Z) and/or the training engine 113 of FIG. 1 for implementing any of the methods described herein.

Instructions 1326 may also reside, completely or partially, within volatile memory 1304 and/or within processing device 1302 during execution thereof by computer system 1300, hence, volatile memory 1304 and processing device 1302 may also constitute machine-readable storage media.

While computer-readable storage medium 1324 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method for generating presentation slides with distilled content, comprising:
    providing a user interface (UI) for presentation to a user, the UI displaying a slide generation UI element allowing the user to request slide generation using content of at least a portion of a data file as source material;
    receiving, via the UI, a user selection of the slide generation UI element;
    identifying a plurality of logical breakpoints in the content based on at least one of a format or size of a plurality of content items of the content;
    determining, based on the identified plurality of logical breakpoints, a set of slides to be included in a slide presentation;
    identifying a layout template for each of the set of slides based on the plurality of content items of the content;
    applying a trained machine learning model to the plurality of content items of the content to obtain an output of the trained machine learning model, the output of the trained machine learning model indicating one or more distilled content items and a format for generating a presentation visualization item comprising the one or more distilled content items, wherein the one or more distilled content items include a subset of the plurality of content items of the content, and wherein the trained machine learning model is trained using training data comprising a set of training files and corresponding summaries for the training files to learn what text segment to include in a distilled content item and what format to use for a presentation visualization item comprising the distilled content item; and
    generating the set of slides based on each identified layout template and the presentation visualization item, the presentation visualization item having the indicated format.

2. The method of claim 1, wherein the UI displays the data file having a plurality of portions and allows the user to select a first portion of the plurality of portions of the data file, wherein the plurality of content items of the content is associated with the first portion of the data file.

3. The method of claim 2, further comprising:
    receiving an indication of a user selection of a second portion of the data file; and
    distilling a second plurality of content items of the second portion of the data file into one or more additional distilled content items to generate a second presentation visualization item, wherein each of the one or more additional distilled content items includes a subset of the second plurality of content items of the second portion of the data file, and wherein at least one slide of the set of slides is further generated based on the second presentation visualization item.

4. The method of claim 1, wherein the training data comprises (i) training inputs comprising the set of training files and (ii) corresponding target outputs comprising the corresponding summaries for the training files, wherein a corresponding target output further comprises a format for a summary of a respective training file.

5. The method of claim 1, wherein the plurality of content items of the content comprises a first set of sentences, and the one or more distilled content items comprise a second set of sentences that includes fewer sentences than the first set of sentences, and wherein the generated presentation visualization item comprises a list that is based on the second set of sentences.

6. The method of claim 1, wherein the plurality of content items of the content comprises a data table, and the one or more distilled content items comprise a range of data from the data table, and wherein the generated presentation visualization item comprises a data chart that is based on the range of data.

7. The method of claim 1, wherein the plurality of content items of the content comprises an image, and wherein the presentation visualization item comprises the image.

8. The method of claim 1, further comprising:
receiving an interaction with the set of slides; and
using the interaction for a heuristic rule to be applied to generation of a subsequent set of slides.

9. The method of claim 1, further comprising:
setting text of a parent header in the data file as a title for the respective layout template of the slide; and
setting the one or more distilled content items including text associated with the parent header as a body for the layout template.

10. A system to generate presentation slides with distilled content, the system comprising:
a memory; and
a processing device, coupled to the memory, to perform operations comprising:
providing a user interface (UI) for presentation to a user, the UI displaying a slide generation UI element allowing the user to request slide generation using content of at least a portion of a data file as source material;
receiving, via the UI, a user selection of the slide generation U I element;
identifying a plurality of logical breakpoints in the content based on at least one of a format or size of a plurality of content items of the content;
determining, based on the identified plurality of logical breakpoints, a set of slides to be included in a slide presentation;
identifying a layout template for each of the set of slides based on the plurality of content items of the content;
applying a trained machine learning model to the plurality of content items of the content to obtain an output of the trained machine learning model, the output of the trained machine learning model indicating one or more distilled content items and a format for generating a presentation visualization item comprising the one or more distilled content items, wherein the one or more distilled content items include a subset of the plurality of content items of the content, and wherein the trained machine learning model is trained using training data comprising a set of training files and corresponding summaries for the training files to learn what text segment to include in a distilled content item and what format to use for a presentation visualization item comprising the distilled content item; and
generating the set of slides based on each identified layout template and the presentation visualization item, the presentation visualization item having the indicated format.

11. The system of claim 10, wherein the training data comprises (i) training inputs comprising the set of training files and (ii) corresponding target outputs comprising the corresponding summaries for the training files, wherein a corresponding target output further comprises a format for a summary of a respective training file.

12. The system of claim 10, wherein the plurality of content items of the content comprises a first set of sentences, and the one or more distilled content items comprise a second set of sentences that includes fewer sentences than the first set of sentences, and wherein the generated presentation visualization item comprises a list that is based on the second set of sentences.

13. The system of claim 10, wherein the plurality of content items of the content comprises a data table, and the one or more distilled content items comprise a range of data from the data table, and wherein the generated presentation visualization item comprises a data chart that is based on the range of data.

14. The system of claim 10, wherein the plurality of content items of the content comprises an image, and wherein the presentation visualization item comprises the image.

15. The system of claim 10, the operations further comprising:
receiving an interaction with the set of slides; and
using the interaction for a heuristic rule to be applied to generation of a subsequent set of slides.

16. The system of claim 10, the operations further comprising:
setting text of a parent header in the data file as a title for the respective layout template of the slide; and
setting the one or more distilled content items including text associated with the parent header as a body for the layout template.

17. A non-transitory, computer-readable medium storing instructions that, when executed by a processing device, cause the processing device to perform operations comprising:
providing a user interface (UI) for presentation to a user, the UI displaying a slide generation UI element allowing the user to request slide generation using content of at least a portion of a data file as source material;
receiving, via the UI, a user selection of the slide generation UI element;
identifying a plurality of logical breakpoints in the content based on at least one of a format or size of a plurality of content items of the content;
determining, based on the identified plurality of logical breakpoints, a set of slides to be included in a slide presentation;
identifying a layout template for each of the set of slides based on the plurality of content items of the content;
applying a trained machine learning model to the plurality of content items of the content to obtain an output of the trained machine learning model, the output of the trained machine learning model indicating one or more distilled content items and a format for generating a presentation visualization item comprising the one or more distilled content items, wherein the one or more distilled content items include a subset of the plurality of content items of the content, and wherein the trained machine learning model is trained using training data comprising a set of training files and corresponding summaries for the training files to learn what text segment to include in a distilled content item and what format to use for a presentation visualization item comprising the distilled content item; and generating the set of slides based on each identified layout template and the presentation visualization item, the presentation visualization item having the indicated format.

18. The non-transitory, computer-readable medium of claim 17, wherein the training data comprises (i) training inputs comprising the set of training files and (ii) corresponding target outputs comprising the corresponding summaries for the training files, wherein a corresponding target output further comprises a format for a summary of a respective training file.

19. The non-transitory, computer-readable medium of claim 17, wherein the plurality of content items of the content comprises a first set of sentences, and the one or more distilled content items comprise a second set of sentences that includes fewer sentences than the first set of sentences, and wherein the generated presentation visualization item comprises a list that is based on the second set of sentences.

20. The non-transitory, computer-readable medium of claim 17, wherein the plurality of content items of the content comprises a data table, and the one or more distilled content items comprise a range of data from the data table, and wherein the generated presentation visualization item comprises a data chart that is based on the range of data.

* * * * *